(12) United States Patent  
Kim

(10) Patent No.: US 7,167,225 B2
(45) Date of Patent: Jan. 23, 2007

(54) LIQUID CRYSTAL DISPLAY WITH SIDE ELECTRODES COPLANAR WITH THE PIXEL ELECTRODES

(75) Inventor: Woo-Hyun Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 46 days.

(21) Appl. No.: 10/653,243

(22) Filed: Sep. 3, 2003

(65) Prior Publication Data

US 2004/0125251 A1 Jul. 1, 2004

(30) Foreign Application Priority Data

Dec. 31, 2002 (KR) .................. 10-2002-0088473

(51) Int. Cl.
*G02F 1/1343* (2006.01)
(52) U.S. Cl. ............... 349/139; 349/111; 349/129
(58) Field of Classification Search ............ 349/141, 349/129, 111
See application file for complete search history.

(56) References Cited

U.S. PATENT DOCUMENTS

| 5,338,240 | A | * | 8/1994 | Kim ........................... 445/24 |
| 5,946,060 | A | * | 8/1999 | Nishiki et al. .............. 349/48 |
| 6,100,953 | A | * | 8/2000 | Kim et al. ................. 349/129 |
| 6,140,158 | A | * | 10/2000 | Rhee et al. ................ 438/149 |
| 6,335,776 | B1 | * | 1/2002 | Kim et al. ................. 349/129 |
| 2001/0019388 | A1 | * | 9/2001 | Kim et al. ................. 349/129 |
| 2002/0080320 | A1 | * | 6/2002 | Suzuki et al. .............. 349/153 |
| 2002/0140892 | A1 | * | 10/2002 | Baek et al. ................ 349/141 |
| 2004/0125251 | A1 | * | 7/2004 | Kim .......................... 349/43 |

FOREIGN PATENT DOCUMENTS

| KR | 1019990070923 | 9/1999 |
| KR | 1020020073447 | 9/2002 |

* cited by examiner

*Primary Examiner*—Andrew Schechter
*Assistant Examiner*—Phu Vu
(74) *Attorney, Agent, or Firm*—Morgan, Lewis & Bockius, LLP

(57) ABSTRACT

A liquid crystal display panel includes a plurality of gate lines arranged along a first direction on a first substrate, a plurality of data lines arranged along a second direction on the first substrate to cross the gate lines to define a plurality of unit pixels, an insulating layer disposed over the gate and data lines, a common electrode disposed on a second substrate opposite to the first substrate, a plurality of pixel electrodes, each pixel electrode provided in each of the unit pixels partitioned by the gate line and the data line, and a plurality of side electrodes overlapping the data lines, wherein the insulating layer is provided between the side electrode and the data lines.

39 Claims, 3 Drawing Sheets

LIQUID CRYSTAL DISPLAY WITH SIDE ELECTRODES COPLANAR WITH THE PIXEL ELECTRODES

The present invention claims the benefit of Korean Patent Application No. P2002-088473 filed in Korea on Dec. 31, 2002, which is hereby incorporated by reference.

BACKGROUND OF THE INVENTION

1. Field of the Invention

The present invention relates to a display panel and a method of fabricating a display panel, and more particularly, to a liquid crystal display panel and a method of fabricating a liquid crystal display panel.

2. Discussion of the Related Art

During fabrication of a liquid crystal display (LCD) device, a liquid crystal material layer is formed between first and second substrates bonded together with a certain cell gap therebetween, wherein an electric field applied to the liquid crystal material layer through electrodes of the first and second substrates is adjusted to control light transmitted through the liquid crystal material layer.

The first and second substrates are bonded together by a seal pattern formed along an outline of an effective image display region. In addition, ball spacers are randomly scattered on the first or second substrates, or patterned spacers are formed on the first or second substrates by photolithographic processes to maintain a certain cell gap between the first and second substrates. Then, the liquid crystal material layer is injected between the first and second substrates within the cell gap.

A plurality of gate lines are horizontally arranged at regular intervals and plurality of data lines are vertically arranged at regular intervals on the first substrate, wherein pixels are defined at crossing regions of the gate and data lines and arranged in a matrix configuration. In addition, each pixel has a thin film transistor (TFT) that functions as a switching device and a pixel electrode connected to the TFT. Accordingly, the TFT includes a gate electrode patterned with the gate lines and electrically connected to the gate lines, a source electrode patterned with the data lines and electrically connected to the data lines, and a drain electrode patterned with the data lines and the source electrode to be electrically connected to the pixel electrode.

In addition, the second substrate includes red, green, and blue color filters provided between pixels and separated by a black matrix, wherein a common electrode, which corresponds to the pixel electrode, is provided on the second substrate.

Presently, twisted nematic-type (TN) LCD devices are commonly used because the liquid crystal molecules are provided parallel to the first and second substrates and are spirally twisted with a certain pitch. In addition, a long axis of the liquid crystal molecules is aligned so as to be consecutively changed, wherein viewing characteristics are determined according to the aligning of the longer axis and an alignment of a shorter axis of liquid crystal molecules. However, in the TN-type LCD devices, since light is not completely shielded in an OFF state, contrast ratio is poor. Moreover, since the contrast ratio is varied in accordance with the viewing angle, light transmittance when displaying gray scale images is changed. In addition, along left and right viewing angles, light transmittance is symmetrically distributed along wide viewing angles. However, along upward and downward viewing angles, light transmittance is asymmetrically distributed, wherein an image reversal region is created along the upward and downward directions, thereby narrowing the viewing angle.

Accordingly, in order to prevent the narrowed viewing angle of the TN-type LCD device, various solutions have been attempted including the use of a film-compensated mode for compensating a viewing angle with a compensated film. In addition, a multi-domain mode for varying a main viewing angle direction by each domain by classifying a unit pixel into multi-domain and an in-plane switching (IPS) mode for operating liquid crystal molecules by a horizontal electric field has been tried.

According to an aligning method of the liquid crystal molecules, the LCD device can be divided into vertical aligning and horizontal aligning LCD devices. The vertical aligning method is used for processing a substrate surface in order to align a longer axis of liquid crystal molecules along a direction vertical to the surface of the substrate, and the horizontal aligning method is used for processing a substrate surface in order to align a longer axis of liquid crystal molecules along a direction horizontal to the surface of the substrate. In order to realize the horizontal aligning method, a vertical aligning film is formed on the substrate surface, and liquid crystal molecules having negative-type dielectric anisotropy is used.

In the vertical aligning type LCD device, a longer axis of liquid crystal molecules is aligned along a direction vertical to the vertical aligning film when a voltage is not supplied. Conversely, since the liquid crystal molecules having the negative-type dielectric anisotropy tends to slant toward an electric field when a voltage is supplied, the longer axis of the liquid crystal molecules is moved from along the vertical direction to along the horizontal direction toward the vertical aligning film. Accordingly, light can be transmitted through the LCD device.

In contrast to the TN-type LCD device, the vertical aligning type LCD device is superior in contrast ratio and response time. In addition, when an aligning direction of the liquid crystal molecules is divided into different directions and a compensated film is used, the vertical aligning type LCD device can effectively obtain a wide viewing angle.

In order to fabricate the vertical aligning type LCD device, a technique for aligning the liquid crystal molecules along a desired direction is applied that includes distorting an electric field supplied to a liquid crystal material layer with a side electrode patterned on a first substrate surface and a rib, or a slit formed on the second substrate surface.

The vertical aligning type liquid crystal display panel will be described in detail with reference to accompanying drawings.

FIG. 1 is a cross sectional view of a unit pixel of a vertical aligning type LCD panel according to the related art. In FIG. 1, a first substrate 10 and a second substrate 20 are together so as to have a cell gap formed therebetween, and a liquid crystal material layer 30, which includes liquid crystal molecules 31 that are vertically aligned, is formed in the cell gap between the first and second substrates 10 and 20. In addition, the first substrate 10 is a thin film transistor (TFT) array substrate of the LCD panel, and the second substrate 20 is a color filter (CF) substrate of the LCD panel.

The first substrate 10 includes side electrodes 12 patterned at regular intervals on a surface of a transparent glass substrate 11, a gate insulating film 13 and an active layer 14 sequentially formed on the surface of the transparent glass substrate 11 upon which the side electrodes 12 are formed, data lines 15 patterned at regular intervals on a surface of the active layer 14, gate lines (not shown) patterned at regular intervals on a surface of the gate insulating film 13, a passivation layer 16 formed on another surface of the active layer 14 upon which the data lines 15 are formed, and a pixel electrode 17 patterned on a surface of the passivation layer 16 corresponding to separated regions of the data lines 15.

The second substrate 20 includes a black matrix 22 formed on a first surface portion of a glass substrate 21 corresponding to the data lines 15, a color filter 23 formed on a second surface portion of the glass substrate 21 upon which the black matrix 22 is formed corresponding to the pixel electrode 17, a common electrode 24 formed on the glass substrate 21 upon which the black matrix 22 and the color filter 23 are formed, and a rib 25 formed on a central portion of the common electrode 24 between adjacent portions of the black matrix 22.

An aligning direction of the liquid crystal molecules 31 vertically aligned in the liquid crystal material layer 30 is varied by a vertical electric field supplied by the pixel electrode 17 formed on the first substrate 10 and the common electrode 24 formed on the second substrate 20. However, viewing angle characteristics of the LCD device deteriorate.

Supplying a certain voltage to the common electrode 24 and to the side electrodes 12 formed on the first substrate 10 distorts a vertical electric field applied to the liquid crystal layer 30. Accordingly, the distorted electric field includes multi-domains that are symmetrically partitioned along left, right, upward, and downward viewing angle directions due to the rib 25 formed on the common electrode 24. Thus, a wide viewing angle of the LCD device can be realized.

According to FIG. 1, a method of fabricating a vertical aligning type LCD panel includes patterning the side electrodes 12 at regular intervals on the surface of the transparent glass substrate 11, wherein the side electrodes 12 are patterned together with gate lines (not shown) and the gate electrodes (not shown) formed on the transparent glass substrate 11. In addition, the side electrodes 12 are patterned to be electrically disconnected with the gate lines and the gate electrodes along an outline of a unit pixel. Moreover, the gate insulating film 13 and the active layer 14 are sequentially formed on the surface of the transparent glass substrate 11 upon which the side electrodes 12 are patterned. The gate insulating film 13 and the active layer 14 are sequentially formed to form a TFT included in the unit pixel of the transparent glass substrate 11.

Then, the data lines 15 are formed at regular intervals on the surface of the active layer 14. Although not shown, the source electrode and the drain electrode of the TFT are simultaneously patterned together with the data lines 15. In addition, the data lines 15 are vertically arranged at regular intervals, the gate lines (not shown) are horizontally arranged at regular intervals, and the unit pixel is defined as a rectangular region formed by crossings of the data lines 15 and the gate lines (not shown). The side electrodes 12 are patterned along the outline of the unit pixel to not be overlapping with the gate lines (not shown) and the data lines 15.

The active layer 14 includes a semiconductor layer made of amorphous silicon and an ohmic contact layer made of n+ amorphous silicon doped with phosphorus (P) at a high concentration, which are sequentially deposited and patterned. When the data lines 15 and the source electrode and the drain electrode are patterned, an exposed portion of ohmic contact layer is removed to form a channel of the TFT. Accordingly, only the semiconductor layer remains.

In addition, the passivation layer 16 is formed on the surface of the active layer 14, wherein the passivation layer 16 is formed of a thin film made of an inorganic material, such as SiNx or SiOx. However, in order to improve an aperture ratio of the LCD device, a thick film made of an organic material, such as benzocyclobutene (BCB), spin on glass (SOG), or photo-acryl, having a low dielectric constant may be applied. Then, the passivation layer 16 is selectively etched to form a drain contact hole (not shown) for exposing a part of the drain electrode (not shown).

The pixel electrode 17 is patterned on the surface of the passivation layer 16 to correspond with separated regions of the side electrodes 12. Accordingly, the pixel electrode 17 is electrically connected to the drain electrode (not shown) of the TFT through the drain contact hole (not shown) formed on the passivation layer 16.

Then, the black matrix 22 is coated on the surface of the transparent glass substrate 21 of the second substrate 20 along the outline of the unit pixels of an image display region. Next, the R, G, and B color filter 23 corresponding to the unit pixels of the image display region is formed on the surface of the transparent glass substrate 21 upon which the black matrix 22 is formed. Then, the common electrode 24 is formed on the surface of the glass substrate 21 including the black matrix 22 and the color filter 23. Accordingly, the black matrix 22 is formed on the regions corresponding to the gate lines, the data lines 15 and the TFT that have been formed in the image display region of the first substrate 10. The black matrix 22 prevents transmission of R, G, and B colored light through the color filter 23 of adjacent units pixels, thereby preventing deterioration of image quality of the LCD panel.

Next, as shown in FIG. 1, the rib 25 is formed on the surface of the common electrode 24 to corresponded to the central portion of the pixel electrode 17. Then, the first and second substrates 10 and 20 are bonded together by a seal pattern such that the pixel electrode 17 and the common electrode 24 correspond to each other.

FIG. 2 is cross sectional view of a unit pixel of a vertical aligning type LCD panel according to the related art. In FIG. 2, side electrodes 32 are formed on the transparent glass substrate 11 of the first substrate 10 by simultaneous patterning of the gate electrode (not shown), and the gate lines (not shown) are formed on the passivation layer 16 by simultaneous patterning of the pixel electrode 17. Accordingly, the side electrodes 32 are formed to be uniformly separated from the pixel electrode 17. In addition, instead of the rib 25 (in FIG. 1) being formed on the common electrode 24 of the second substrate 20, a slit 36 may be formed by etching the common electrode 24. For example, side electrodes 32 are patterned on the passivation layer 16 together with the pixel electrode 17 so as to be uniformly separated from the pixel electrode 17, and the slit 36 is formed in the etched region of the common electrode 24.

In FIGS. 1 and 2, the side electrodes 12 and 32 of the vertical aligning type LCD panels are formed along the outline of the unit pixel defined as a rectangular region by the crossed gate lines (not shown) and the data lines 15, and the pixel electrode 17 is patterned at regions between the side electrodes 12 and 32 of the unit pixel. Accordingly, an effective liquid crystal control region of the unit pixel that corresponds to the pixel electrode 17 on the first substrate 10 and the common electrode 24 on the second substrate 20 is reduced due to the side electrodes 12 and 32 that are formed along the outline of the unit pixel, whereby an aperture ratio of the LCD device is reduced. In addition, an alignment direction of the liquid crystal molecules 31 is changed by distorting the vertical electric field supplied between the pixel electrode 17 and the common electrode 24 by the side electrodes 12 and 32. Accordingly, an alignment of the liquid crystal molecules 31 is dispersed by the voltage variation of the data lines 15, whereby light leakage occurs in boundary regions of the data lines 15 and the pixel electrode 17 and image quality is reduced.

SUMMARY OF THE INVENTION

Accordingly, the present invention is directed to a liquid crystal display panel and method of fabricating a liquid crystal display panel that substantially obviates one or more of the problems due to limitations and disadvantages of the related art.

An object of the present invention to provide a liquid crystal display panel and a fabrication method thereof capable of improving picture quality by improving an aperture ratio of a vertical aligning type liquid crystal display panel and minimizing influences due to voltage variation of data lines.

An object of the present invention to provide a liquid crystal display panel having an improved an aperture ratio.

Another object of the present invention to provide a liquid crystal display panel having reduced influence due to voltage variation of data lines.

An object of the present invention to provide a method of fabricating a liquid crystal display panel having an improved an aperture ratio.

Another object of the present invention to provide a method of fabricating a liquid crystal display panel having reduced influence due to voltage variation of data lines.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes a plurality of gate lines arranged along a first direction on a first substrate, a plurality of data lines arranged along a second direction on the first substrate to cross the gate lines to define a plurality of unit pixels, an insulating layer disposed over the gate and data lines, a common electrode disposed on a second substrate opposite to the first substrate, a plurality of pixel electrodes, each pixel electrode provided in each of the unit pixels partitioned by the gate line and the data line, and a plurality of side electrodes overlapping the data lines, wherein the insulating layer is provided between the side electrode and the data lines.

In another aspect, a liquid crystal display panel includes a plurality of gate lines formed on a first substrate, a first insulating layer and an active layer formed on the first substrate, a plurality of data lines formed on a surface of the active layer, a second insulating layer formed on another surface of the active layer upon which the data lines are formed, a plurality of side electrodes formed on a surface of the second insulating layer to overlap the data lines, and a plurality of pixel electrodes formed on surfaces of the second insulating layer separated from the side electrodes.

In another aspect, a method for fabricating a liquid crystal display panel includes forming a plurality of gate lines, a plurality of data lines, and a plurality of thin film transistors on a first substrate, forming a passivation layer on a surface of the first substrate upon which the gate lines, the data lines, and the thin film transistors are formed, forming a transparent conductive material on a surface of the passivation layer, forming a plurality of side electrodes overlapping the data lines by patterning the transparent conductive material, forming a plurality of pixel electrodes separated from the side electrodes by patterning the transparent conductive material, forming a black matrix, a color filter, and a common electrode on a second substrate, forming an electric field partition on the common electrode, bonding the first and second substrates together aligning the pixel electrodes to the common electrode, and forming a liquid crystal material layer between the bonded first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
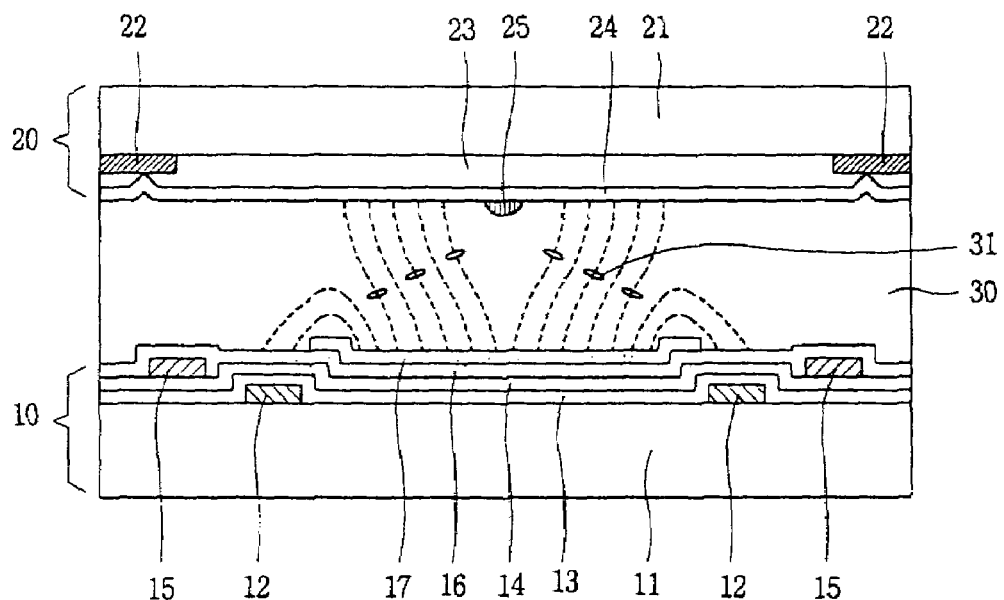
FIG. 1 is a cross sectional view of a unit pixel of a vertical aligning type LCD panel according to the related art.
Figure 2:
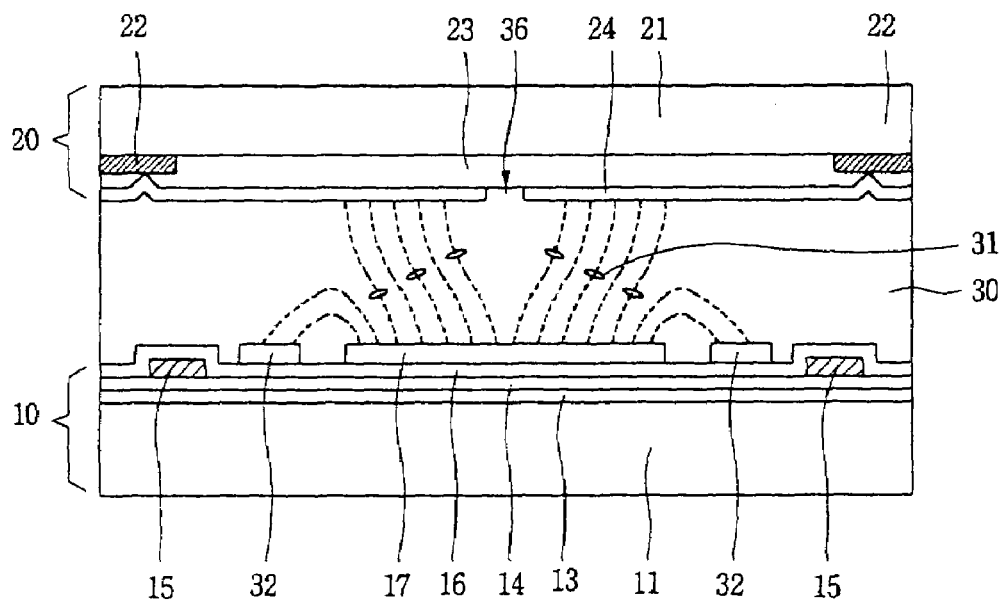
FIG. 2 is cross sectional view of a unit pixel of a vertical aligning type LCD panel according to the related art.
Figure 3:
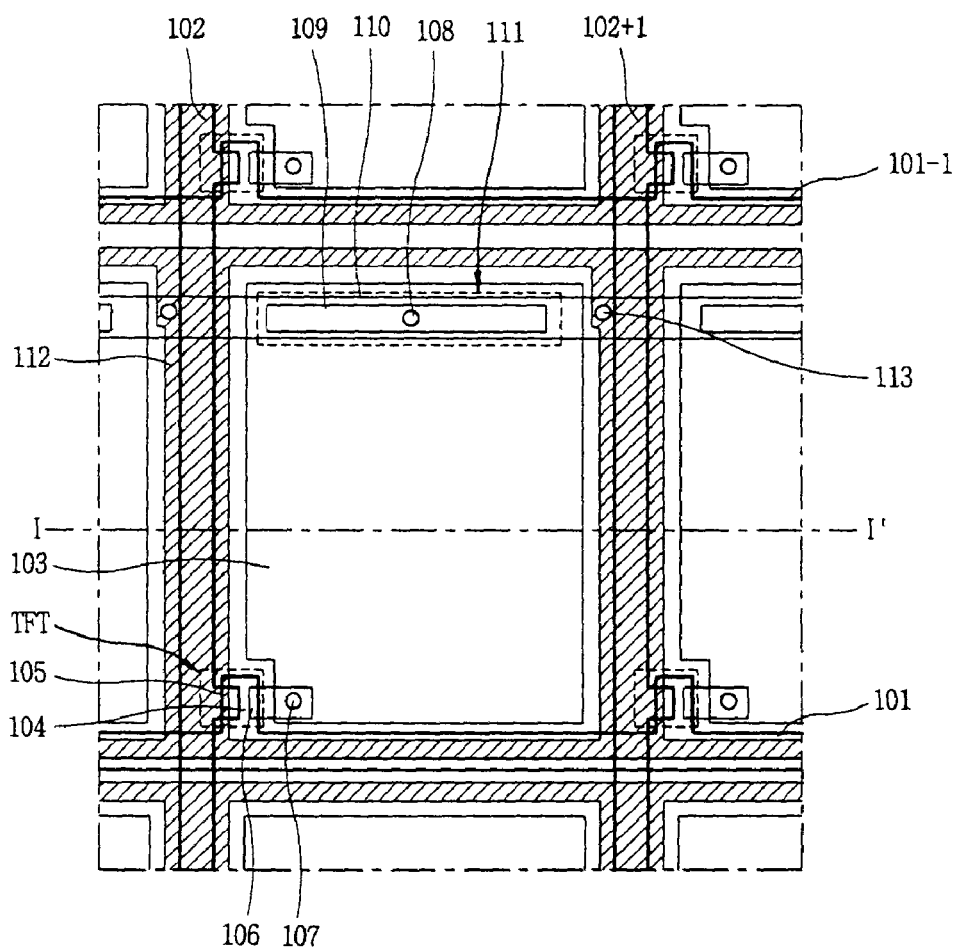
FIG. 3 is a plan view of an exemplary LCD panel according to the present invention.

FIG. 3 is a plan view of an exemplary LCD panel according to the present invention. In FIG. 3, gate lines 101–1 and 101 may be arranged along a horizontal direction at regular intervals, and data lines 102 and 102+1 may be arranged along a vertical direction at regular intervals. Accordingly, the gate lines 101–1 and 101 and the data lines 102 and 102+1 may cross each other, wherein a unit pixel may be defined as a rectangular region formed by crossing the gate lines 101–1 and 101 and the data lines 102 and 102+1, and may include a TFT and a pixel electrode 103.

The TFT may include a gate electrode 104 that extends from a position of the gate line 101, a source electrode 105 that extends from a position of the data line 102 and overlaps a part of the gate electrode 104, and a drain electrode 106 formed to correspond to the source electrode 105 in relation to the gate electrode 104. In addition, the drain electrode 106 may be electrically connected to a pixel electrode 103 through a drain contact hole 107. For example, the pixel electrode 103 may include transparent conductive material(s), such as indium tin oxide (ITO) or indium zinc oxide (IZO).

Furthermore, the TFT may include a semiconductor layer (not shown) having a conductive channel formed between the source electrode 105 and the drain electrode 106 when a scan signal is supplied to the gate electrode 104. Accordingly, the conductive channel may be formed between the source electrode 105 and the drain electrode 106 of the TFT, wherein a data signal supplied to the source electrode 105 from the data line 102 may be transmitted to the drain electrode 106 via the conductive channel. Since the drain electrode 106 is electrically connected to the pixel electrode 103 through the drain contact hole 107, the data signal supplied to the drain electrode 106 may be supplied to the pixel electrode 103. Thus, the pixel electrode 103 and a common electrode (not shown), which may be formed on a color filter layer (not shown), together may induce an electric field in a liquid crystal material layer. As a result, liquid crystal molecules of the liquid crystal material layer may rotate due to dielectric anisotropy and transmit light, wherein a quantity of transmitted light may be adjusted by the data signal.

In FIG. 3, the pixel electrode 103 may contact a storage electrode 109 through a storage contact hole 108, wherein the storage electrode 109 may function as a storage capacitor 111 by overlapping a common voltage line 110 arranged in parallel to the gate line 101-1 with a gate insulating layer (not shown) provided therebetween. Accordingly, the storage capacitor 111 may charge a voltage value of the data signal for a turn-ON period of the TFT in which the scan signal is supplied to the gate line 101. Then, the storage capacitor 111 may supply the charged voltage to the pixel electrode 103 for a turn-OFF period of the TFT such that operation of the pixel may be maintained.

In addition, the side electrode 112 may be patterned having a rectangular band shape to be separated from the pixel electrode 103, wherein vertical sides of the side electrode 112 may overlap the data lines 102 and 102+1. In addition, a horizontal line may be formed between the gate line 101-1 and the common voltage line 110, and another horizontal line may be patterned to overlap the gate line 101. Accordingly, the side electrode 112 may be electrically connected to the common voltage line 110 through the side contact hole 113. Furthermore, the side electrode 112 may be patterned together with the pixel electrode 103, and may include transparent conductive material(s), such as indium tin oxide (ITO) or indium zinc oxide (IZO).

In FIG. 3, the side electrode 112 may be patterned to overlap the data lines 102 and 102+1 and the gate line 101 such that the pixel electrode 103 may extend to peripheral portions of the unit pixel and an aperture ratio may increase. For example, an effective liquid crystal control region of the unit pixel corresponding to an area of the pixel electrode 103 may be expanded by forming the side electrode 112 to overlap the data lines 102 and 102+1 and the gate line 101.

In FIG. 3, a horizontal side of the side electrode 112 may be patterned as a rectangular band shape to be formed between the gate line 101-1 and the common voltage line 110. However, the horizontal side of the side electrode 112 may be formed to overlap the gate line 101-1. Accordingly, by forming the side electrode 112 to overlap the gate lines 101 and 101-1 and the data lines 102 and 102+1, the aperture ratio of the LCD panel increases.

Figure 4:
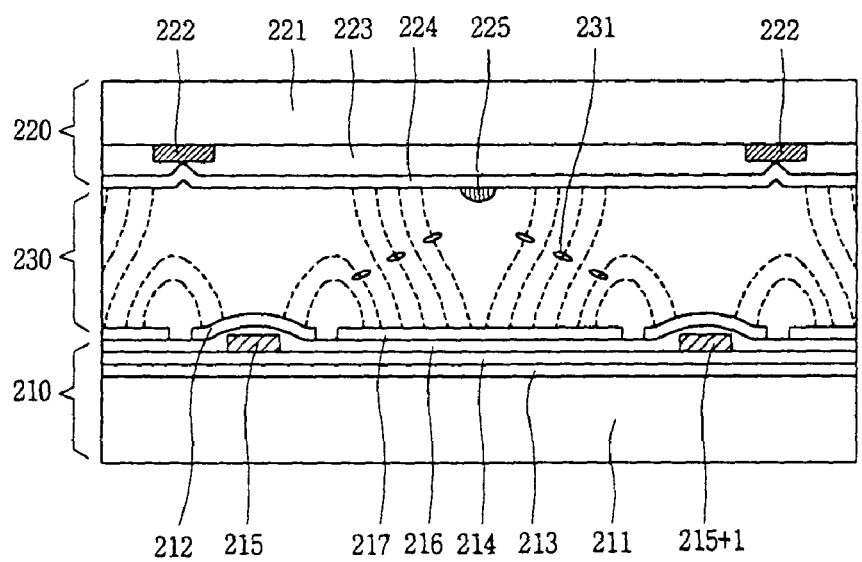
FIG. 4 is a cross sectional view of along I–I' of FIG. 3 according to the present invention.

FIG. 4 is a cross sectional view of along I–I' of FIG. 3 according to the present invention. In FIG. 4, a first substrate 210 and a second substrate 220 may be bonded together to have a cell gap formed therebetween, and a liquid crystal material layer 230, which has vertically aligned liquid crystal molecules 230, may be formed in the cell gap between the first and second substrates 210 and 220. Accordingly, the first substrate 210 may be a TFT array substrate of the LCD panel, the second substrate 220 may be a color filter substrate of the LCD panel, and the liquid crystal material layer 230 may be formed including the liquid crystal molecules 231 having negative type dielectric anisotropy.

The first substrate 210 may include a gate insulating layer 213 and an active layer 214 sequentially formed on a surface of a transparent glass substrate 211, a plurality of data lines 215 and 215+1 patterned on a surface of the active layer 214 to be uniformly separated, a passivation layer 216 formed on another surface of the active layer 214 including the data lines 215 and 215+1, side electrodes 212 patterned on a surface of the passivation layer 216 to overlap the data lines 215 and 215+1, and a pixel electrode 217 patterned on a surface of the passivation layer 216 to be separated from the side electrodes 212.

The second substrate 220 may include a black matrix 222 formed on a surface of a glass substrate 221 corresponding to the data lines 215 and 215+1 of the first substrate 210, a color filter 223 formed on a surface of the glass substrate 221 corresponding to the pixel electrode 217, a common electrode 224 formed on the glass substrate 221 upon which the black matrix 222 and the color filter 223 may be formed, and a rib 225 formed on a central portion of the common electrode 224 between adjacent portions of the black matrix 222.

An alignment direction of the vertically aligned liquid crystal molecules 231 of the liquid crystal material layer 230 may vary by induction of a vertical electric field supplied by the pixel electrode 217 formed on the first substrate 210 and the common electrode 224 formed on the second substrate 220. Accordingly, supplying certain voltages to the common electrode 224 and the side electrodes 212 may prevent asymmetrical distortion of the electric field. For example, multi-domains of the electric field may be symmetrically partitioned along left, right, upward, and downward viewing angle directions by using the rib 225 formed on the common electrode 224. Thus, the improved viewing angles of the LCD device may be realized. Alternatively, although not shown, instead of forming the rib 225 on the common electrode 224 of the second substrate 210, a slit may be formed by etching the common electrode 224 to form two separated common electrodes.

In order to effectively partition the vertically aligned electric field induced to the liquid crystal material layer 230 through the pixel electrode 217 and the common electrode 224, at least one rib 225 or slit may be formed on the common electrode 224 to have various shapes.

Accordingly, the side electrodes 212 may be formed to overlap the data lines 215 and 215+1 having the passivation layer 216 therebetween. Accordingly, in order to minimize a parasitic capacitance according to the overlap of the side electrodes 212 and the data lines 215 and 215+1, the passivation layer 216 may include at least one film of organic material(s) having low dielectric constant(s), such as benzocyclobutene (BCB), spin on glass (SOG), or photoacryl.

It is possible to expand an area of the pixel electrode 217 to an outline of the unit pixel, and the aperture ratio can be improved. For example, an effective liquid crystal control region of the unit pixel corresponding to an area of the pixel electrode 217 formed on the first substrate 210 and the common electrode 240 formed on the second substrate 220 may be expanded by forming the side electrodes 212 to overlap the data lines 215 and 215+1 such that an aperture ratio may be improved. In addition, by forming the side electrodes 212 to overlap the data lines 215 and 215+1 between adjacent pixels, the aperture ratio may be improved Furthermore, by forming the side electrodes 212 to overlap the data lines 215 and 215+1, when the alignment direction of the liquid crystal molecules 231 is changed by distorting the vertically aligned electric field, influences due to the voltage variation of the data lines 215 and 215+1 may be minimized. Accordingly, image quality may be improved by preventing light leakage at the outline of the unit pixel.

In FIG. 4, an exemplary method of fabricating a vertical aligning type LCD panel may include sequentially forming the gate insulating layer 213 and the active layer 214 on the surface of the transparent glass substrate 211 of the first substrate 210. The gate insulating layer 213 and the active layer 214 may be sequentially formed to form a TFT included in the unit pixel of the transparent glass substrate 211.

Then, the data lines 215 and 215+1 may be patterned on the surface of the active layer 214 to be separated. Although not shown, the source electrode and the drain electrode of the TFT may be simultaneously patterned together with the data lines 215 and 215+1. The data lines 215 and 215+1 may be arranged along a horizontal direction at regular intervals, the gate lines (not shown) may be arranged along a vertical direction at regular intervals, and a unit pixel may be defined as a rectangular region formed by a crossing of the data lines 215 and 215+1 and the gate lines (not shown).

The active layer 214 may be formed to include a semiconductor layer made of amorphous silicon and an ohmic contact layer made of n+ amorphous silicon doped with phosphorus (P) at high concentrations by sequentially deposited and patterning the amorphous silicon. Then, an exposed portion of ohmic contact layer may be removed to function as a channel of the TFT. Accordingly, only the semiconductor layer remains.

Next, the passivation layer 216 may be formed on the surface of the active layer 214 upon which the data lines 215 and 215+1 may be patterned. The passivation layer 216 may be formed of a thick film including organic material(s), such as benzocyclobutene (BCB), spin-on-glass (SOG), or photoacryl, having a low dielectric constant may be provided to improve an aperture ratio of the LCD device and to minimize a parasite capacitance generated between the data lines 215 and 215+1 and the side electrodes 212 with the passivation layer 216 therebetween.

Then, the passivation layer 216 may be selectively etched to form a drain contact hole (not shown) for exposing a part of the drain electrode. Next, a transparent conductive material, such as ITO or IZO, may be formed on the surface of the passivation layer 216 and then patterned. Then, the side electrodes 212 may be formed to overlap the data lines 215 and 215+1, and the pixel electrode 217 may be patterned in the unit pixel region between the side electrodes 212. Accordingly, the pixel electrode 217 may be electrically connected to the drain electrode (not shown) of the TFT through the drain contact hole (not shown) formed at the passivation layer 216.

The black matrix 222 may be coated on the surface of the transparent glass substrate 221 of the second substrate 220 along the outline of pixels of an image display region. Then, the color filter 223 may be formed on the surface of the glass substrate 221 upon which the black matrix 222 is formed to correspond to the unit pixel of the image display region. Next, the common electrode 224 may be formed on the surface of the transparent glass substrate 221 including the black matrix 222 and the color filter 223. Accordingly, the black matrix 222 may be formed on regions corresponding to the gate lines (not shown), the data lines 215 and 215+1, and the TFT formed in the image display region of the first substrate 210. Thus, the black matrix 222 may prevent transmission of mixtures of R, G, and B colored light through the color filter 223 of adjacent unit pixels, wherein image quality is improved.

Next, the rib 225 may be formed on the surface of the common electrode 224 to correspond to the central portion of the pixel electrode 217. Although not shown, instead of the rib 225, a slit may be formed instead of the rib 225 by etching the common electrode 224 to form separated common electrodes. Thus, in order to effectively partition the vertically aligned electric field induced to the liquid crystal material layer 230 to be symmetrical along various viewing angle directions, at least one rib 225 or slit may be formed on the common electrode 224 to have various shapes.

The first and second substrates 210 and 220 may be bonded together by a seal pattern to align the pixel electrode 217 and the common electrode 224.

Figure 5:
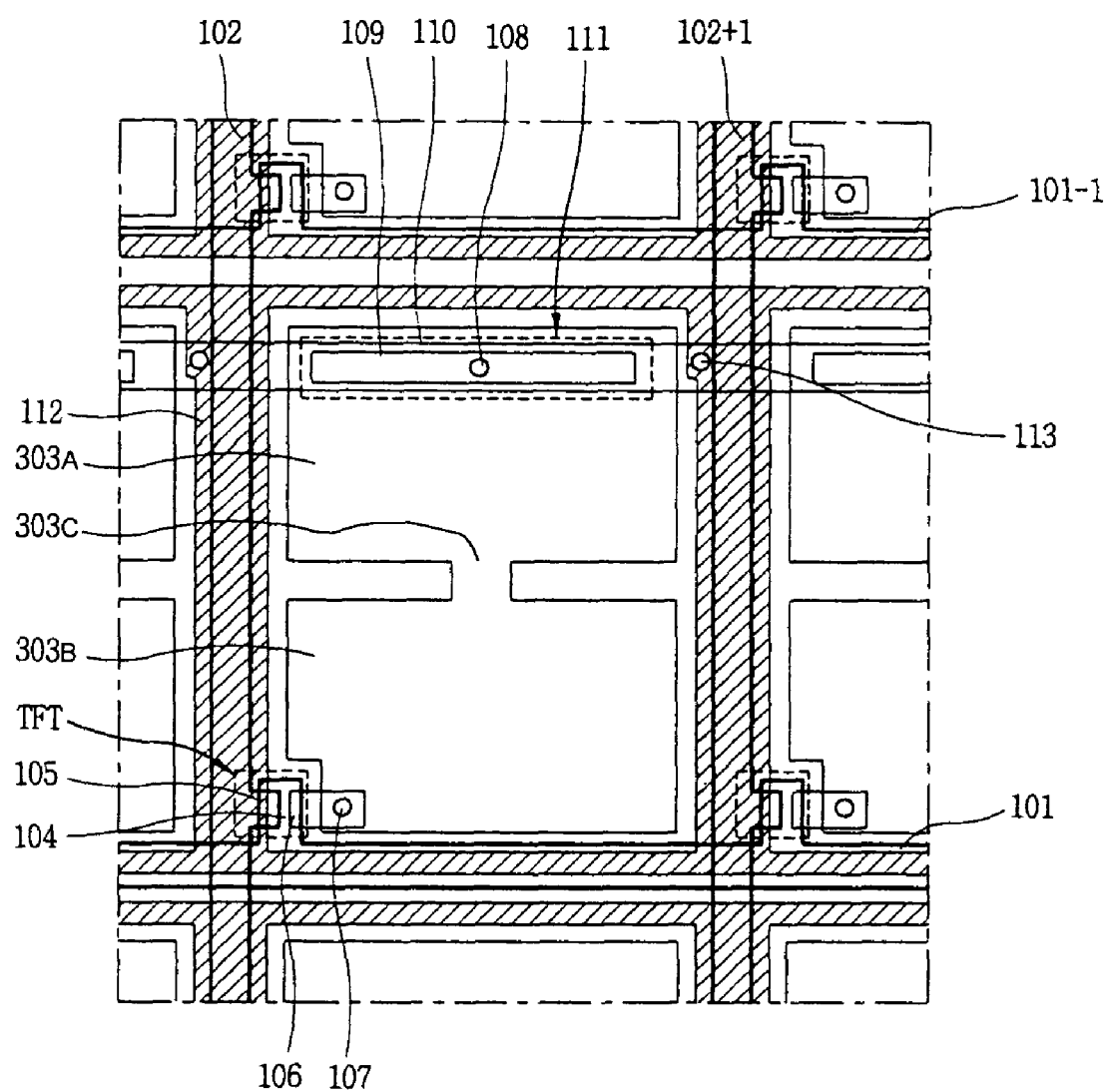
FIG. 5 is a plan view of another exemplary LCD panel according to the present invention.

FIG. 5 is a plan view of another exemplary LCD panel according to the present invention. In FIG. 5, a unit pixel may be divided into a first region 303A and a second region 303B that may be electrically interconnected through a connection region 303C. In addition, ribs (not shown) may be formed at the first and second regions 303A and 303B, respectively. For simplicity, elements of FIG. 5 similar to elements of FIG. 3 have retained the same numbers.

In FIG. 5, by dividing the unit pixel into the first and second regions 301A and 301B and forming the ribs 302A and 302B at central portions of the first and second regions 301A and 301B, respectively, liquid crystal molecules may be symmetrically aligned along an outline of the unit pixel. Accordingly, wide viewing angles may be realized for the LCD device. Thus, by forming the side electrode so as to be overlapped with the gate lines and the data lines by having the passivation layer therebetween, an area of the pixel electrode may be expanded to the utmost to the outline of the unit pixel, and accordingly the aperture ratio of the liquid crystal display panel can be improved.

In addition, by forming the side electrodes 212 (in FIG. 4) to overlap the gate lines 101 and 101-1 and the data lines 102 and 102+2 of adjacent pixels, it may be possible to improve the aperture ratio. In addition, by forming the side electrodes 212 (in FIG. 4) to overlap with the gate lines 101 and 101-1 and the data lines 102 and 102+2, influences due to the voltage variation of the gate lines 101 and 101-1 and the data lines 102 and 102+2 may be minimized. Accordingly, by preventing light leakage along the outline of the unit pixel, image quality may be improved.

It will be apparent to those skilled in the art that various modifications and variations can be made in the liquid crystal display panel and method of fabricating a liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A liquid crystal display panel, comprising:
   a plurality of gate lines arranged along a first direction on a first substrate;
   a plurality of data lines arranged along a second direction on the first substrate to cross the gate lines to define a plurality of unit pixels;
   an insulating layer disposed over the gate and data lines;
   a common electrode disposed on a second substrate opposite to the first substrate;

a plurality of pixel electrodes, each pixel electrode provided in each of the unit pixels partitioned by the gate line and the data line; and a plurality of side electrodes overlapping the data lines along a length direction of the data lines, the side electrode in the pixel being extended to a neighboring pixel, wherein the insulating layer is provided between the side electrode and the data lines, a width of the side electrode is greater than a width of the data lines, and side portions of the side electrodes are coplanar with side portions of the pixel electrodes along a surface of the insulating layer.

2. The panel according to claim 1, further comprising a thin film transistor provided in the unit pixel.

3. The panel according to claim 1, wherein the pixel electrode and the side electrode are made of a same material.

4. The panel according to claim 3, wherein the pixel electrode and the side electrodes comprise transparent conductive material films.

5. The panel according to claim 1, wherein each of the side electrodes are provided between adjacent unit pixels.

6. The panel according to claim 1, wherein the insulating layer includes an organic material film.

7. The panel according to claim 6, wherein the insulating layer includes at least one of benzocyclobutene (BCB), spin-on-glass (SOG), and photo-acryl.

8. The panel according to claim 1, wherein the side electrodes overlap the gate lines with at least the insulating layer therebetween.

9. The panel according to claim 1, wherein the pixel electrode is divided into a first region and a second region and the first and second regions are electrically interconnected by a connection region.

10. A liquid crystal display panel, comprising:
a plurality of gate lines formed on a first substrate;
a first insulating layer and an active layer formed on the first substrate;
a plurality of data lines formed on a surface of the active layer;
a second insulating layer formed on another surface of the active layer upon which the data lines are formed;
a plurality of side electrodes formed on a surface of the second insulating layer to overlap the data lines along a length direction of the data lines, the side electrode in the pixel being extended to a neighboring pixel; and
a plurality of pixel electrodes formed on surfaces of the second insulating layer separated from the side electrodes,
wherein a width of the side electrode is greater than a width of the data lines, and side portions of the side electrodes are coplanar with side portions of the pixel electrodes along a surface of the second insulating layer.

11. The panel according to claim 10, wherein the first insulating layer is a gate insulating layer separating a gate electrode from the active layer.

12. The panel according to claim 10, wherein the second insulating layer includes an organic material layer.

13. The panel according to claim 10, further comprising:
a second substrate bonded to the first substrate;
a liquid crystal material layer formed between the first and second substrates;
a black matrix formed on a surface of the second substrate aligned to the gate lines and the data lines;
a color filter layer formed on the second substrate aligned with the unit pixel;
a common electrode formed on another surface of the second substrate upon which the black matrix and the color filter layer are formed; and
an electric field partition formed on the second substrate.

14. The panel according to claim 13, further comprising a liquid crystal material layer formed between the first and second substrates.

15. The panel according to claim 14, wherein the liquid crystal material layer has negative dielectric anisotropy.

16. The panel according to claim 13, wherein the electric field partition is a rib formed on a surface of the common electrode.

17. The panel according to claim 13, wherein the electric field partition is a slit formed between adjacent portions of the common electrode.

18. The panel according to claim 10, further comprising a plurality of partitions formed on the first substrate between adjacent ones of the plurality of pixel electrodes.

19. A method for fabricating a liquid crystal display panel, comprising:
forming a plurality of gate lines, a plurality of data lines, and a plurality of thin film transistors on a first substrate;
forming a passivation layer on a surface of the first substrate upon which the gate lines, the data lines, and the thin film transistors are formed;
forming a transparent conductive material on a surface of the passivation layer;
forming a plurality of side electrodes extending along a length direction of the data lines and overlapping the data lines by patterning the transparent conductive material, the side electrode in the pixel being extended to a neighboring pixel;
forming a plurality of pixel electrodes separated from the side electrodes by patterning the transparent conductive material;
forming a black matrix, a color filter, and a common electrode on a second substrate;
forming an electric field partition on the common electrode;
bonding the first and second substrates together aligning the pixel electrodes to the common electrode; and
forming a liquid crystal material layer between the bonded first and second substrates,
wherein a width of the side electrode is greater than a width of the data lines, and side portions of the side electrodes are coplanar with side portions of the pixel electrodes along a surface of the passivation layer.

20. The method according to claim 19, wherein the transparent conductive material includes at least one of indium tin oxide (ITO) an indium zinc oxide (IZO).

21. The method according to claim 19, further comprising etching the passivation layer to expose drain electrode portions of the thin film transistors.

22. The method according to claim 19, wherein the forming of an electric field partition includes forming at least one rib on a surface of the common electrode.

23. The method according to claim 19, wherein the forming of an electric field partition includes forming at least one slit in the common electrode by etching a part of the common electrode.

24. The method according to claim 19, wherein the forming a plurality of side electrodes and the forming a plurality of pixel electrodes is performed simultaneously by the patterning of the transparent conductive material.

25. A liquid crystal display panel, comprising:
a plurality of gate lines arranged along a first direction on a first substrate;
a plurality of data lines arranged along a second direction on the first substrate to cross the gate lines to define a plurality of unit pixels;
an insulating layer disposed over the gate and data lines;
a common electrode disposed on a second substrate opposite to the first substrate;
a plurality of pixel electrodes, each pixel electrode provided in each of the unit pixels partitioned by the gate line and the data line to form a first electric field between the common electrode and the pixel electrode; and
a plurality of side electrodes overlapping the data lines along a length direction of the data lines, the side electrode in the pixel being extended to a neighboring pixel, the side electrode causing a second electric field with the pixel electrode to distortion the first electrode field,
wherein the insulating layer is provided between the side electrode and the data lines and a width of the side electrode is greater than a width of the data lines, and side portions of the side electrodes are coplanar with side portions of the pixel electrodes along a surface of the insulating layer.

26. The panel according to claim 25, wherein the pixel electrode and the side electrode are made of a same material.

27. The panel according to claim 25, wherein each of the side electrodes are provided between adjacent unit pixels.

28. The panel according to claim 25, wherein the side electrodes overlap the gate lines with at least the insulating layer therebetween.

29. The panel according to claim 25, wherein the pixel electrode is divided into a first region and a second region and the first and second regions are electrically interconnected by a connection region.

30. A liquid crystal display panel, comprising:
a plurality of gate lines formed on a first substrate;
a first insulating layer and an active layer formed on the first substrate;
a plurality of data lines formed on a surface of the active layer;
a second insulating layer formed on another surface of the active layer upon which the data lines are formed;
a plurality of side electrodes formed on a surface of the second insulating layer to overlap the data lines along a length direction of the data lines, the side electrode in the pixel being extended to a neighboring pixel; and
a plurality of pixel electrodes formed on surfaces of the second insulating layer separated from the side electrodes, the electric field,
wherein a width of the side electrode is greater than a width of the data lines, and side portions of the side electrodes are coplanar with side portions of the pixel electrodes along a surface of the second insulating layer.

31. The panel according to claim 30, further comprising:
a second substrate bonded to the first substrate;
a liquid crystal material layer formed between the first and second substrates;
a black matrix formed on a surface of the second substrate aligned to the gate lines and the data lines;
a color filter layer formed on the second substrate aligned with the unit pixel;
a common electrode formed on another surface of the second substrate upon which the black matrix and the color filter layer are formed; and,
an electric field partition formed on the second substrate.

32. The panel according to claim 31, further comprising a liquid crystal material layer formed between the first and second substrates.

33. The panel according to claim 31, wherein the electric field partition is a rib formed on a surface of the common electrode.

34. The panel according to claim 31, wherein the electric field partition is a slit formed between adjacent portions of the common electrode.

35. The panel according to claim 30, further comprising a plurality of partitions formed on the first substrate between adjacent ones of the plurality of pixel electrodes.

36. A method for fabricating a liquid crystal display panel, comprising:
providing a first substrate and a second substrate;
forming a black matrix, a color filter, and a common electrode on the second substrate;
forming a plurality of gate lines, a plurality of data lines, and a plurality of thin film transistors on the first substrate;
forming a passivation layer on a surface of the first substrate upon which the gate lines, the data lines, and the thin film transistors are formed;
forming a pixel electrode on a surface of the passivation layer, a first electric field being formed between the common electrode and the pixel electrode;
forming a plurality of side electrodes extending along a length direction of the data lines and overlapping the data lines by patterning the transparent conductive material, the side electrode in the pixel being extended to a neighboring pixel, a second electric field being formed between the pixel electrode and the side electrode to distortion the first electric field;
forming an electric field partition on the common electrode;
bonding the first and second substrates together aligning the pixel electrodes to the common electrode; and
forming a liquid crystal material layer between the bonded first and second substrates,
wherein a width of the side electrode is greater than a width of the data lines, and side portions of the side electrodes are coplanar with side portions of the pixel electrodes alone a surface of the passivation layer.

37. The method according to claim 36, further comprising etching the passivation layer to expose drain electrode portions of the thin film transistors.

38. The method according to claim 36, wherein the forming of an electric field partition includes forming at least one rib on a surface of the common electrode.

39. The method according to claim 36, wherein the forming of an electric field partition includes forming at least one slit in the common electrode by etching a part of the common electrode.

* * * * *